O. D. MOCK.
HOSE RACK.
APPLICATION FILED MAY 21, 1915.
1,155,262.
Patented Sept. 28, 1915.
2 SHEETS—SHEET 1.
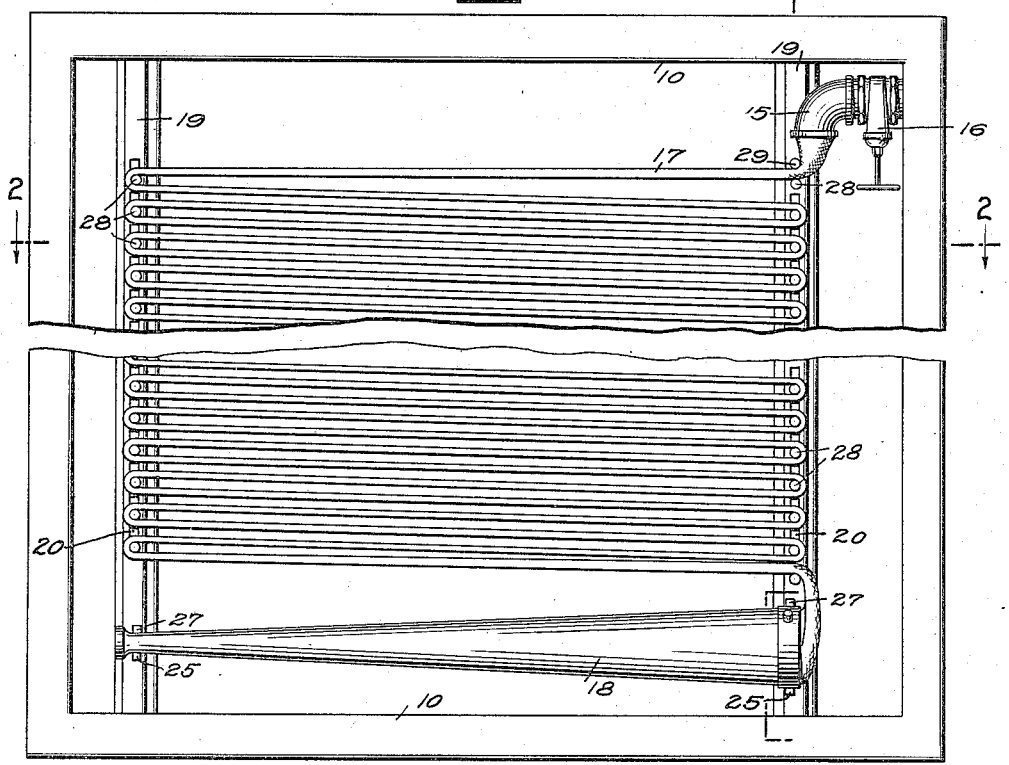
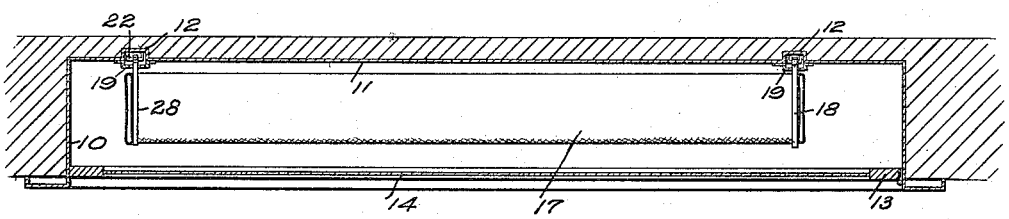
WITNESSES
INVENTOR
O. D. Mock
BY
ATTORNEYS O. D. MOCK.
HOSE RACK.
APPLICATION FILED MAY 21, 1915.
1,155,262.
Patented Sept. 28, 1915.
2 SHEETS—SHEET 2.
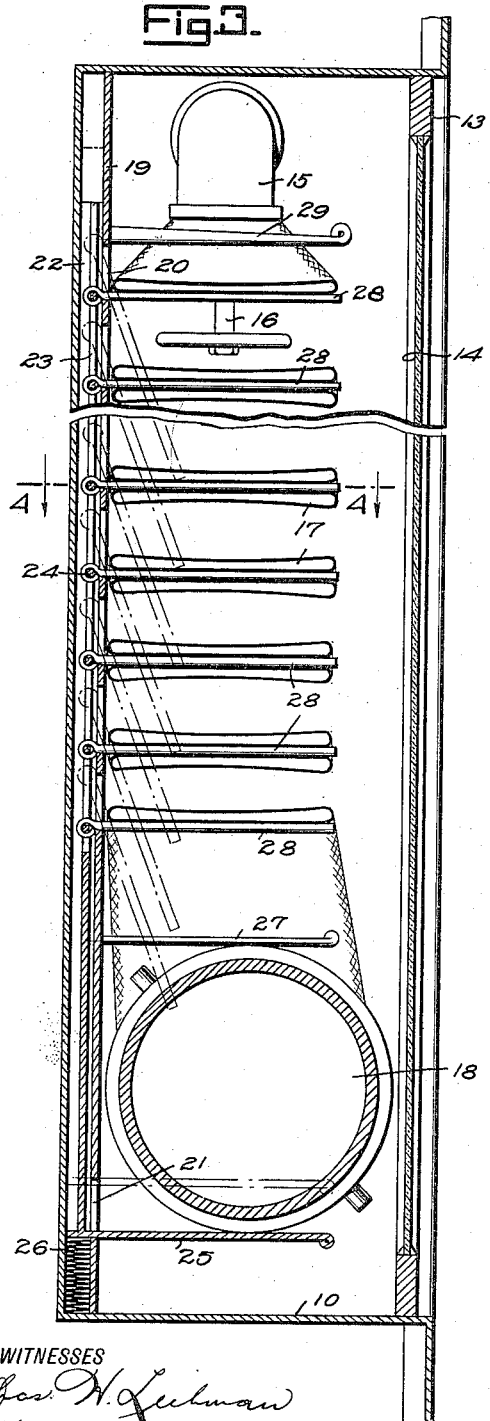
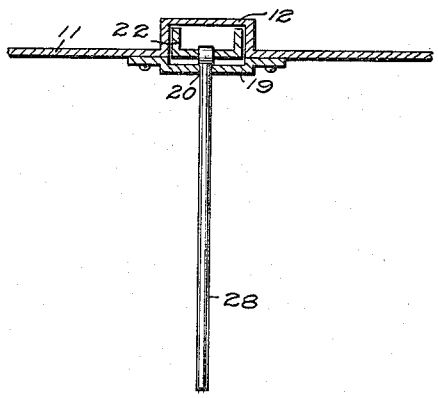
WITNESSES
INVENTOR
O.D. Mock
BY
ATTORNEYS

UNITED STATES PATENT OFFICE.

OTTO D. MOCK, OF LOUISVILLE, KENTUCKY.

HOSE-RACK.

1,155,262.  Specification of Letters Patent.  Patented Sept. 28, 1915.

Application filed May 21, 1915. Serial No. 29,533.

*To all whom it may concern:*

Be it known that I, OTTO D. MOCK, a citizen of the United States, and a resident of Louisville, in the county of Jefferson and State of Kentucky, have invented a new and Improved Hose-Rack, of which the following is a full, clear, and exact description.

This invention relates to water distribution and has particular reference to hose racks such as are adapted for use in connection with office buildings or other analogous structures for supporting fire hose in position to be easily accessible in case of emergency.

Among the special objects of this invention is to provide a support for fire hose of such a nature as to make it well adapted for secluding the hose, if desired, for economy of space, within the wall, making what is known as a flush rack.

Another object of the invention is to so design a hose rack as to make it of a most rapid nature for the delivery of the hose for prompt action in case of fire and at the same time providing a construction which may be used not only as a flush rack but as an exposed or wall rack.

A further object of the invention is to provide a hose rack comprising fixed and movable parts including a pair of fingers serving while in normal sustaining position to prevent the flow of water through the pipe even though the water is turned on from the main preliminary to discharging the hose from the rack.

A still further object of the invention is to construct a hose rack comprising relatively fixed and movable parts, certain of the parts coöperating with each other in such a manner as to support therebetween the hose nozzle, said nozzle constituting a key normally locking the parts from relative movement and supporting the hose in position, and providing that when the nozzle is withdrawn from normal position, the movable parts will automatically shift, allowing the hose to drop.

The foregoing and other objects of the invention will hereinafter be more fully described and claimed and illustrated in the drawings forming a part of this specification in which like characters of reference indicate corresponding parts in all the views, and in which—

Figure 1 is a front elevation of my invention; Fig. 2 is a transverse section on the line 2—2 of Fig. 1, the hose being broken away; Fig. 3 is a vertical sectional view on the line 3—3 of Fig. 1; and Fig. 4 is a transverse vertical section on the line 4—4 of Fig. 3.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show more or less in detail the adaptation of the invention as a flush rack, the same being housed within a casing 10 built into a wall and having its rear portion in the nature of a plate 11 of sheet metal or the like provided with a plurality of vertical grooves or grooved portions 12. Fig. 2 shows best the relation of the casing 10 to the wall structure and indicating an expedient having a door 13 with preferably a glass plate 14 closing the same and presenting a view of the hose in its normal position within the casing.

At 15 I show a fragment of a standpipe having a valve 16 controlling the flow of water therefrom. To the standpipe is connected a hose 17 adapted to be folded loop by loop upon the supporting device herein provided, and terminating in a nozzle 18.

Each of the grooves 12 is boxed in or inclosed by a face plate 19 having formed therein a vertical row of openings or slots 20 and also a slot 21 at or near its bottom.

Arranged within the groove 12 is a vertically slidable channel member 22 having a vertical row of slots 23 formed therein corresponding in location and number to the slots 20 of the face plate 19. The slots 23, however, are slightly longer than the slots 20 and each two adjacent slots 23 are separated by a narrow structure forming a pivot 24. At the lower end of the channel member 22 is formed or secured a foot piece 25 which projects forwardly through the adjacent slot 21 at substantially a right angle to the main bar 22. A spring 26 is located in the bottom of each of the grooves 12 and bears normally upwardly upon the lower end of the bar 22 or the foot piece 25 secured thereon, the spring being normally under pressure tending to lift the bar.

27 indicates a fixed pin secured to the face plate 19 adjacent and slightly above the foot piece 25. The normal distance between these two members corresponds to the diameter of that portion of the nozzle which lies normally between them serving as a key to lock the bar 22 downwardly against the force of the spring 26.

At 28 I show a series of fingers pivoted upon the pivot members 24 of the slidable bar 22 and projecting forwardly through the slots 20 of the face plate. The fingers are held by the face plate and bar normally in horizontal position, but are adapted to be tilted downwardly under the force of gravity and the action of the hose thereon when the bar 22 is moved upwardly under the force of the spring 26, as suggested in dotted lines in Fig. 3, when the key is removed from between the foot piece and the finger 27. In other words, the pivot portions 24 of the bar 22 carry the pivotal ends of the fingers 28 directly upwardly, the shank portions of the fingers moving into inclined position in the slots 20 with their free ends hanging down. The hose 17 is looped upon these movable fingers 28 where it is normally supported as shown in Fig. 1. The detail description of the movable bar 22 and parts associated therewith will be understood as applying to the similar structure at the opposite end of the casing, these parts being duplicated, and the nozzle acts as a key to lock both of the bars in normal position.

As shown in Fig. 1 also, the last movable finger 28 nearest the standpipe 15 coöperates with a fixed finger 29 holding the adjacent end of the hose in collapsed form and preventing the free flow of water therethrough from the standpipe after the valve 16 is opened preliminary to withdrawing the nozzle from normal position to allow the hose to drop.

With the parts constructed and arranged as set forth herein, in case of fire the door 13 may be opened or the glass 14 may be broken to provide access to the hose. The water then may be turned on at the valve 16 and the operator then grasps the nozzle, jerking it outwardly from its normal position, setting free the foot pieces 25 and allowing the bars 22 to be lifted under the force of their springs 26. The fingers 28 by this action will be allowed to drop and allowing the bulk of the hose likewise to drop freely therefrom. The last finger 28 being thus set free from coöperation with the fixed finger 29, the water flows readily through the hose as desired. For reracking the hose, the nozzle is put in place, locking the bars 22 downwardly against the springs and causing the fingers 28 to assume their normal horizontal position. Then the hose is looped or wound back and forth upon the movable fingers as already set forth. This hose apparatus is very safe and prompt in its action and is easily manipulated. The proximity of the planes of the face plates 19 and the pivot portions 24 of the slidable bars demands a comparatively slight vertical movement for the bars 22 to allow the fingers 28 to drop the hose. The springs 26 furthermore need not be excessively strong, since the weight of the hose coöperates with them to lift the bars 22. The nozzle is a key member of rigid construction which makes a positive lock preventing any liability of accidental dropping or tangling of the hose in the casing.

I claim:—

1. In a fire hose rack, the combination of a stationary member having a vertical series of slots, a slidable bar adjacent said slots, a series of fingers projecting through said slots and pivoted to said bar, means to hold the bar in a certain position causing the fingers to project in a horizontal position therefrom, and means acting upon the bar to move the same with relation to the fixed member allowing the hose to drop from the fingers after said holding means are withdrawn.

2. In a device of the nature set forth, the combination of a fixed member having a series of slots therein, a movable bar adjacent said slots, a series of fingers pivoted to said bar and projecting outwardly through said slots, a spring acting upon the bar tending to move it in one direction, and means acting in the other direction upon the bar against the force of said spring and normally locking the same in fixed position, causing the pivoted fingers to project in a horizontal position for normally supporting the hose thereon.

3. In a hose rack, the combination of a fixed member having a rigid finger projecting outwardly therefrom, a movable bar slidable along the fixed member and having adjacent one end a rigid member projecting parallel to and adjacent the first mentioned rigid member, means acting upon the bar tending to move it to cause its connected rigid member to move toward the first rigid member, a locking device arranged between said rigid members normally resisting such movement, and a series of hose supporting devices connected to one of the main members aforesaid and coöperating with the other of them to cause the devices to be maintained normally in horizontal position.

4. In a hose rack, the combination of a vertical stationary member, a movable bar adjacent the stationary member, a series of fingers pivoted to one of said first mentioned members and coöperating with the other to determine their holding position, a fixed finger secured to the stationary member, a foot piece secured to the slidable bar and arranged substantially parallel to the fixed finger, and means coöperating with the bar and its foot piece with respect to the fixed finger to determine the holding position of the pivoted fingers.

5. In a fire hose rack, the combination with a standpipe, a flexible hose secured thereto and a rigid nozzle connected to the other end of the hose, of a supporting device for the hose and nozzle comprising a rigid stationary member having fixed fingers projecting horizontally therefrom, the upper finger lying above the hose, a series of movable fingers coöperating with the vertical rigid member, means acting through the nozzle aforesaid and the other of said fixed fingers to lock the movable fingers in normal horizontal position to support the hose and uppermost movable finger gripping the hose between it and said upper stationary finger.

6. In a device of the character set forth, the combination with a standpipe, a flexible hose secured thereto and a rigid nozzle connected to the other end of the hose, of a vertical rigid member having a rigid finger secured thereto and projecting horizontally therefrom adjacent the upper portion of the hose and close to the standpipe, a slidable bar adjacent the vertical rigid member, a series of hose supporting fingers pivotally connected to said bar and coöperating with said stationary member, and means coöperating with said nozzle to lock the movable member with the pivoted fingers in horizontal position causing the uppermost pivoted finger to grip the hose between it and said fixed horizontal finger.

OTTO D. MOCK.

Witnesses:
   BRINTON B. DAVIS,
   THOWALD G. FROST.

Copies of this patent may be obtained for five cents each, by addressing the "Commissioner of Patents, Washington, D. C."